United States Patent
Cui et al.

(10) Patent No.: US 8,584,254 B2
(45) Date of Patent: Nov. 12, 2013

(54) DATA ACCESS REPORTING PLATFORM FOR SECURE ACTIVE MONITORING

(75) Inventors: Weidong Cui, Redmond, WA (US); Marcus Peinado, Bellevue, WA (US); Martim Carbone, Atlanta, GA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/314,209

(22) Filed: Dec. 8, 2011

(65) Prior Publication Data

US 2013/0152207 A1    Jun. 13, 2013

(51) Int. Cl.
G06F 15/16    (2006.01)
H04L 29/06    (2006.01)
H04L 9/32    (2006.01)
G06F 21/00    (2013.01)
G06F 7/04    (2006.01)

(52) U.S. Cl.
USPC ............... 726/26; 713/193; 726/1; 726/10

(58) Field of Classification Search
USPC ............................. 719/313; 717/128; 718/1
See application file for complete search history.

(56) References Cited

U.S. PATENT DOCUMENTS

| | | | |
|---|---|---|---|
| 7,441,249 B2* | 10/2008 | Adachi et al. | 719/313 |
| 8,429,708 B1* | 4/2013 | Tandon | 726/1 |
| 2001/0044904 A1 | 11/2001 | Berg et al. | |
| 2007/0180450 A1* | 8/2007 | Croft et al. | 718/1 |
| 2009/0089591 A1* | 4/2009 | Mattsson | 713/193 |
| 2009/0138939 A1* | 5/2009 | Kumar et al. | 726/1 |
| 2009/0222901 A1* | 9/2009 | Schneider | 726/10 |
| 2011/0023019 A1* | 1/2011 | Aniszczyk et al. | 717/128 |

OTHER PUBLICATIONS

Sharif, et al., "Secure In-VM Monitoring Using Hardware Virtualization", Retrieved at <<http://research.microsoft.com/en-us/um/people/wdcui/papers/sim-ccs09.pdf>>, Proceedings of the 16th ACM Conference on Computer and Communications Security (CCS), Nov. 9-13, 2009, pp. 477-487.

Payne, et al., "Lares: An Architecture for Secure Active Monitoring Using Virtualization", Retrieved at <<http://www.bryanpayne.org/research/papers/oakland08.pdf>>, IEEE Symposium on Security and Privacy—S&P, May 2008, pp. 233-247.

Petroni, et al., "Automated Detection of Persistent Kernel Control-Flow Attacks", Retrieved at <<http://www.cs.umd.edu/~mwh/papers/sbcfi.pdf>>, Proceedings of the 14th ACM Conference on Computer and Communications Security (CCS), Oct. 29-Nov. 2, 2007, pp. 103-115.

Xiong, et al., "Practical Protection of Kernel Integrity for Commodity OS from Untrusted Extensions", Retrieved at <<http://www.isoc.org/isoc/conferences/ndss/11/pdf/3_1.pdf>>, Network and Distributed Systems Security Symposium, Internet Society, 2011, pp. 1-17.

* cited by examiner

Primary Examiner — Shin-Hon Chen
(74) Attorney, Agent, or Firm — Medley, Behrens & Lewis, LLC (57) ABSTRACT

Technologies pertaining to detecting accesses to monitored regions of memory and transmitting data to a protection system responsive to the detecting are described herein. A region of memory that includes objects in an object graph utilized by an operating system to determine which processes to execute and an order to execute such processes is monitored. If a process executing on a processor attempts to write to an object in the object graph, a field that is being written to is identified, and a determination is made regarding whether the field includes a pointer. Based upon whether the field includes a pointer, a type of write desirably undertaken by the object is ascertained, and an object event is transmitted to the protection system that informs the protection system of the type of write.

20 Claims, 9 Drawing Sheets

DATA ACCESS REPORTING PLATFORM FOR SECURE ACTIVE MONITORING

BACKGROUND

To facilitate prevention of malicious code from executing on computing devices, users often install protection systems thereon, wherein protection systems include but are not limited to anti-malware systems (e.g., anti-virus systems), anti-spyware systems, or the like. Malicious code that is desirably detected by such protection systems includes viruses, root kits, or some other form of malware. Currently available protection systems utilize various techniques to identify potential attacks on a computer system. An exemplary technique is to perform a scan of computer-readable storage on a computing device to identify any files that may possibly be harmful to the computing device. Another technique that is employed by protection systems is referred to as active monitoring, wherein a protection system actively intercepts system events as they occur on the computing device, and the protection system then interprets associated states of such events in accordance with the goals of the protection system. Exemplary events that are intercepted by conventional protection systems include events of reading data from a file, writing data to a file, creating a new file, opening a network connection, amongst other system events. The protection system may then analyze the state of the computing device to ascertain whether the event may correspond to an attack on the computer.

Some active monitoring solutions currently employed by conventional protection systems rely on the use of primitives that are known as "code execution hooks." To implement a code execution hook, existing code is patched or control data is modified (such as function pointers) to diverge the control flow of an operating system into a handler of the protection system each time an event of interest is triggered. With more specificity, operating systems typically expose functions for performing system events. By monitoring system events, an inference can be made that one of the exposed functions has been called (e.g., file read, file write functions), and the protection system can be notified. A sophisticated attacker, however, may obtain a copy of the exposed functions and cause them to be executed without generating a corresponding system event.

Another inherent flaw in conventional computer security is that the protection systems are installed on the computing devices that they are configured to protect. Therefore, if a malicious process is able to obtain certain privileges, the process can disable the protection system on the computing device, thereby rendering such protection system ineffective against attacks directed towards the computing device.

SUMMARY

The following is a brief summary of subject matter that is described in greater detail herein. This summary is not intended to be limiting as to the scope of the claims.

Described herein are various technologies pertaining to computer protection systems, such as but not limited to anti-virus systems, anti-malware systems, or the like. With more specificity, various technologies pertaining to the inference of system events based upon monitored data structures (objects) are described herein. Operating systems that are installed on computing devices oftentimes generate a graph of data structures that identify processes to be executed by a computing device as well as an order of execution of the processes. In accordance with an exemplary embodiment, accesses to such data structures can be monitored, and system events that are desirably undertaken by a process executing on the computer device can be inferred based upon the monitoring of the data structures. System events that can be inferred include process creation, file creation, an incoming network connection request, or some other suitable event that is oftentimes utilized by malicious code to perform an attack on a computer. For example, a range of memory that is known to retain such data structures can be monitored, such that when a process executing on a processor attempts to access one of such data structures, the requested access can be identified. For instance, a page of memory that is known to retain data structures of interest can be analyzed to ascertain if the address of the access request corresponds to a data structure that is desirably monitored.

If it is ascertained that the access request corresponds to a desirably monitored data structure, then a type of the access can be ascertained. For instance, the process may wish to create a new data structure, remove an existing data structure, or modify an existing data structure. The type of access to the memory location may then be provided to a protection system, which can infer a system event based upon the type of access to the memory location requested by the process executing on the processor. The protection system can then, in an example, scan an image file utilized to launch the process to determine if such process is malicious.

In an exemplary embodiment, the process that is desirably accessing the monitored data structure may execute on a first computing partition while the protection system executes on a second, separate computing partition. Thus, the protection system is not co-located with the computing partition that is desirably protected by such protection system. For instance, the protection system may execute on a host virtual machine (also referred to as a root virtual machine), wherein the protection system desirably protects a guest virtual machine. Accordingly, the process that accesses the monitored data structures may be executing in the guest virtual machine. A hypervisor has control over physical memory utilized by the guest virtual machine, and can identify a range in physical memory that includes data structures that are desirably monitored. Furthermore, the hypervisor can disable write permission for memory pages that include data structures that are desirably monitored. This causes any write request to such pages to be trapped to the hypervisor, which can then ascertain whether the address of the request corresponds to a data structure that is desirably monitored. If the write request is directed towards an address in the page of memory that does not correspond to a data structure of interest, the hypervisor can allow the process to perform the requested write operation and cause the operating system executing in the guest virtual machine to resume at a next instruction. If, however, the write request is directed towards an address in the memory page that corresponds to a data structure that is desirably monitored, the hypervisor can be configured to collect data pertaining to the write request and transmit such data to a process that ascertains a type of memory write that is to be undertaken with respect to the data structure by the process executing in the guest virtual machine.

A separate process executing in the host virtual machine can receive an address in memory that is the subject of the write request and can identify an object instance (an instance of the data structure) that is the subject of the request. Further, the separate process can identify a field of the data structure that is the subject of the write request. In an exemplary embodiment, this can be accomplished by comparing the target address of the write operation against a list of memory intervals that correspond to object instances retained in memory, and thereafter determining a field offset based upon the particular field of the object instance that is being accessed. Based upon the object instance, the field offset, and field value, an object event can be ascertained, wherein the object event indicates a type of write with respect to an object that is desirably made by the process executing on the processor. Types of writes include object modification, object creation, and object deletion. An object event can include further information pertaining to the write, including fields that are to be written, existing values of the field, and the like. Object events may then be passed to the protection system, which can perform some action (generating a warning, preventing the process from being executed, etc.) based upon the object event. For example, the protection system can infer a system event based upon one or more object events. In another embodiment, another process can infer system events based upon object events, and the protection system can be provided with system events.

Other aspects will be appreciated upon reading and understanding the attached figures and description.

DETAILED DESCRIPTION

Various technologies pertaining to monitoring data structures (objects) in memory and providing data to a protection system based upon the monitoring of the objects will now be described with reference to the drawings, where like reference numerals represent like elements throughout. In addition, several functional block diagrams of exemplary systems are illustrated and described herein for purposes of explanation; however, it is to be understood that functionality that is described as being carried out by certain system components may be performed by multiple components. Similarly, for instance, a component may be configured to perform functionality that is described as being carried out by multiple components. Additionally, as used herein, the term "exemplary" is intended to mean serving as an illustration or example of something, and is not intended to indicate a preference.

As used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices.

Figure 1:
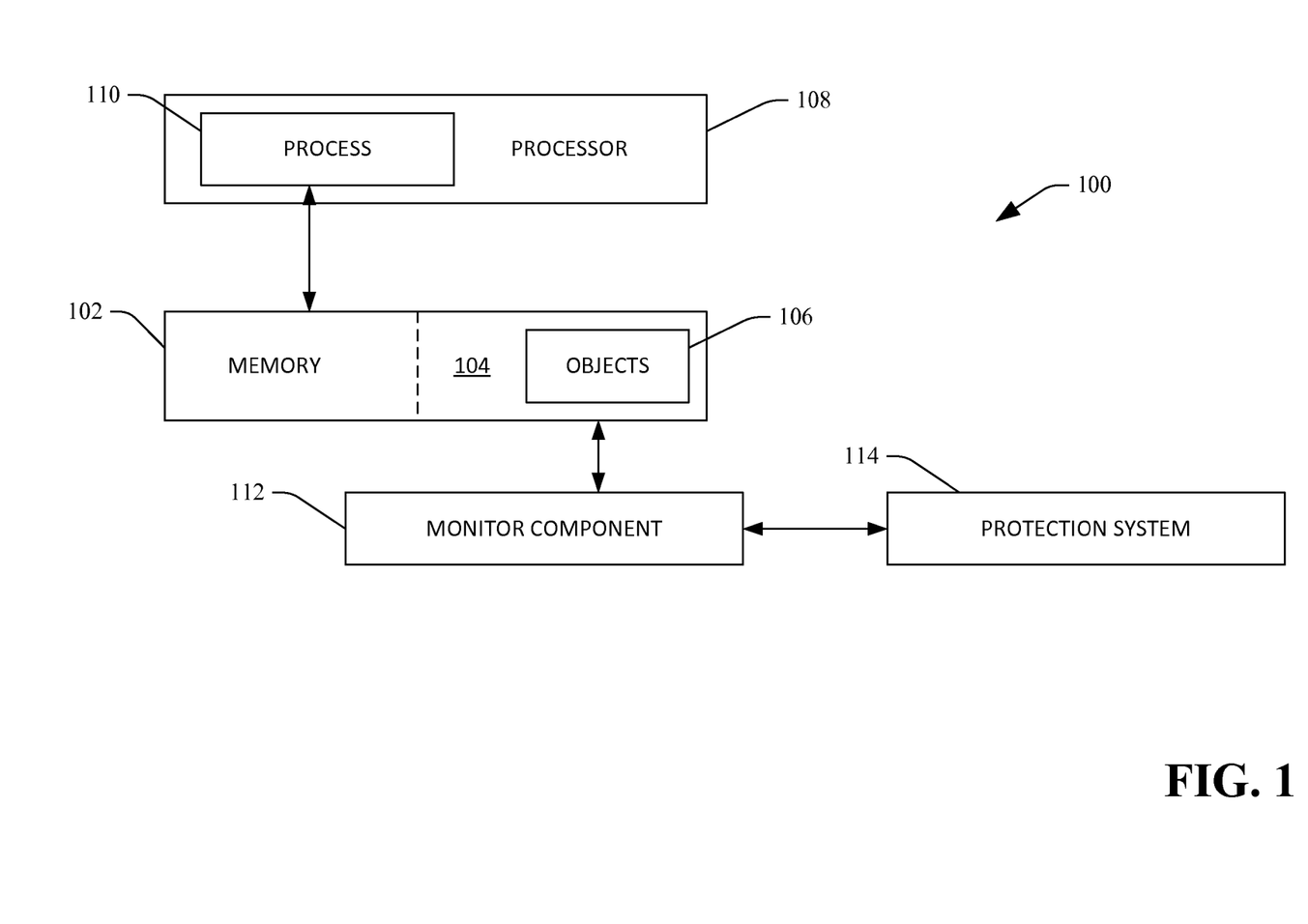
FIG. 1 is a functional block diagram of an exemplary system that facilitates actively monitoring accesses to data structures in a region of memory.

With reference now to FIG. 1, an exemplary system 100 that facilitates monitoring a computing device for malicious code is illustrated. The system 100 comprises a memory 102, which can be any suitable type of memory, including but not limited to flash memory, ROM, RAM, DRAM, SRAM, EPROM, EEPROM, etc. The memory 102 includes a range 104 that is known to comprise a plurality of objects (data structures) 106. For example, the range 104 may be a page of the memory 102, a plurality of sequential pages of the memory 102, or a plurality of non-sequential pages of the memory 102. A location of the range 104 in the memory 102 can be defined at boot up of a computing partition that utilizes the memory 102, and can be updated by the operating system if the range 104 changes (if the objects 106 become located in different pages of the memory 102, if the objects are removed from one or more pages of the memory 102, etc.). The objects 106 may have respective types assigned thereto, may include a plurality of respective fields, wherein the fields include respective values. Thus, the objects 106 are data structures rather than executable instructions.

The system 100 further comprises a processor 108 that executes instructions that are retained in the memory 102. More specifically, the processor 108 has a process 110 executing thereon that accesses certain portions of the memory 102. For example, the process 110 may be a process employed by an operating system, a process of an application, malicious code, or other suitable process.

The system 100 further comprises a monitor component 112 that monitors accesses to the range 104 of the memory 102 that includes the objects 106. Pursuant to an example, the process 110 executing on the processor 108 can attempt to access the range 104 of the memory 102. The monitor component 112 can monitor the range 104 of the memory 102 and can intercept the request to access the range 104 of the memory 102. Responsive to intercepting such access request, the monitor component 112 ascertains whether the access request is directed towards a monitored object in the range 104 of the memory 102 or if the access request is directed to data/code that is not monitored but is co-located with a desirably monitored object. For example, the range 104 of the memory 102 may comprise a page of the memory 102, wherein such page includes both objects that are desirably monitored and data that is not desirably monitored. Accordingly, the monitor component 112 can first ascertained that the page is desirably accessed by the process 110 executing on the processor 108, and may then further determine that the process 110 has requested access to a desirably monitored object from the objects 106. The monitor component 112 can then output data that includes information pertaining to the request to access the range 104 of the memory 102.

The system 100 further comprises a protection system 114 that is configured to protect the computing partition that utilizes the processor 108 and the memory 102 from attack. Thus, the protection system 114 may be an anti-malware system, such as an antivirus system, an anti-spyware system, or other suitable protection system. The protection system 114 receives an object event from the monitor component 112 or from some other component that processes data output by the monitor component 112 to generate the object event. An object event indicates a type write desirably undertaken with respect to the memory range 104 (create a new object, delete an object, or modify an object), a type of the object, data that identifies a field of the object that is subject to the write request, and a current value of such field. The protection system 114 may then undertake some action based at least in part upon the object event. In an exemplary embodiment, the monitor component 112 may have sufficient information to directly generate an object event for transmittal to the protection system 114. In other embodiments that will be described in greater detail below, an additional component can be employed to gather sufficient information to generate an object event for provision to the protection system 114. Responsive to receiving the object event, the protection system 114 can perform an action, including scanning an image file utilized to launch the process, scanning a file that is desirably read or written to by the process, etc.

In an exemplary embodiment, an operating system executing on a computing device (e.g. in a virtual machine) can, at boot up, generate a pointer that points to an object graph, wherein the object graph corresponds to a plurality of processes that are to be executed by the processor 108, and wherein the objects have values that define an order of execution of the processes. For example, the object graph may be a linked list of objects, such that the objects 106 are included in the linked list of objects, the objects correspond to processes to be executed by the processor 108, and the objects 106 include pointers to other objects that define a sequence of processes to be executed by the processor 108. It is to be understood, however, that the system 100 can be utilized to monitor memory regions corresponding to any suitable object graph, and accordingly the features described herein are not limited to linked lists. The operating system can maintain the pointer in a consistent position in the memory 102, such that the monitor component 112 can identify the range 104 of memory that includes the objects 106 in the object graph. As will be understood by one skilled in the art, creation of a new object in the objects 106 can be an indicator that a new process has been created and is desirably executed by the processor 108. Deletion of an object from amongst the objects 106 can indicate that a process that was to be executed by the processor 108 is no longer desirably executed by the processor 108. Modification of an object in the objects 106 can indicate that priority of a process has changed, that a certain process may be skipped, that an order of execution of processes has changed, etc.

In an exemplary embodiment, the system 100 can be comprised by any suitable computing device, including a desktop computing device, a laptop computing device, a tablet computing device, a mobile telephone, a gaming console, a mobile gaming console, etc. As will be described in greater detail below, in another exemplary embodiment, the system 100 may be distributed across separate partitions of a computing device. In still yet another exemplary embodiment, the system 100 may be distributed across different computing devices.

Figure 2:
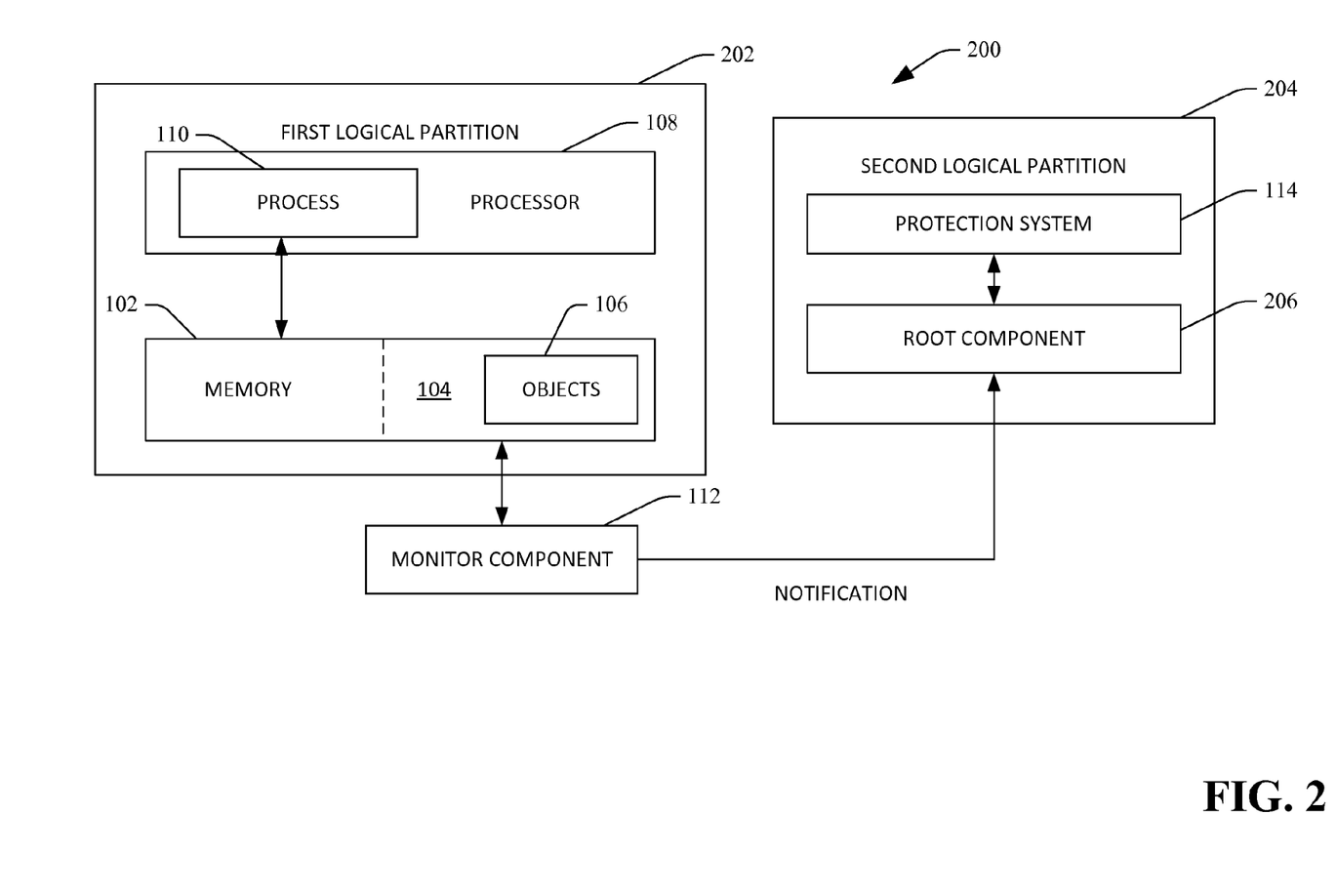
FIG. 2 is a functional block diagram of an exemplary system that facilitates providing a protection system executing on a computing partition with an indication that a desirably monitored data structure has been accessed.

Now referring to FIG. 2, an exemplary system 200 that facilitates protecting a partition of a computing device from malicious code is illustrated. The system 200 includes a first computing partition 202 that is in communication with a second computing partition 204. For example, the first computing partition 202 may be a first virtual machine executing on a computing device and the second computing partition 204 may be a second virtual machine executing on the computing device. In another example, the first computing partition 202 may be a computing device and the second computing partition 204 may be a trusted platform module (TPM) or other separate trusted module that is in communication with the first computing partition 202.

As shown, the first computing partition 202 includes the memory 102 and the processor 108. As will be understood by one skilled in the art, the processor 108 may be a virtual processor and the memory 102 may be virtual memory. The second computing partition 204 comprises the protection system 114, wherein the protection system 114 is configured to prevent execution of malicious code on the processor 108. Accordingly, the protection system 114 is separated from the first computing partition 202 such that malicious code executed by the processor 108 is unable to disable the protection system 114.

The monitor component 112 also executes outside of the first logical partition 202, such that malicious code is unable to disable the monitor component 112. In an exemplary embodiment, the monitor component 112 can execute in a third computing partition that is separate from both the first computing partition 202 and the second computing partition 204. In another exemplary embodiment, the second computing partition 204 may include the monitor component 112. Regardless of the location of the monitor component 112, the monitor component 112 can have knowledge of the range 104 of the memory 102 that includes the objects 106, and maintain such knowledge as the location of the objects 106 in the memory 102 changes over time. As described above, the monitor component 112 can intercept requests to write to the range 104 of the memory 102 by the process 110 executing on the processor 108. The monitor component 112 can ascertain whether the write request from the process 110 is directed towards a monitored object in the range 104 of the memory 102, or to a non-monitored data element co-located in the range 104 of the memory 102. If the monitor component 112 ascertains that the process 110 requests to write to a monitored object in the range 104 of the memory 102, the monitor component 112 can output a notification. In an exemplary embodiment, the notification output by the monitor component 112 can include data that identifies the first computing partition 202, data that identifies the processor 108, data that identifies the address of the memory 102 targeted by the process 110, and data that indicates that the access request was directed to a particular object in the range 104 of the memory 102.

The second computing partition 204 may include a root component 206 that receives the notification from the monitor component 112. While the root component 206 is shown as being included in the second computing partition 204, it is to be understood that the root component 206 may be co-located with the monitor component 112 or may be located on a separate computing partition. In an exemplary embodiment, the monitor component 112 and the root component 206 can reside on a hypervisor, and can execute as a single component. As the monitor component 112 is shown as residing outside of the first computing partition 202, the monitor component 112 may not have access to sufficient data to generate an object event (which identifies a type of memory write desirably performed by the process 110). The root component 206 can receive the notification from the monitor component 112 and can generate an object event responsive to receiving such notification. The root component 206 may then provide the object event to the protection system 114, which can perform some suitable action based at least in part upon the received object event.

Figure 3:
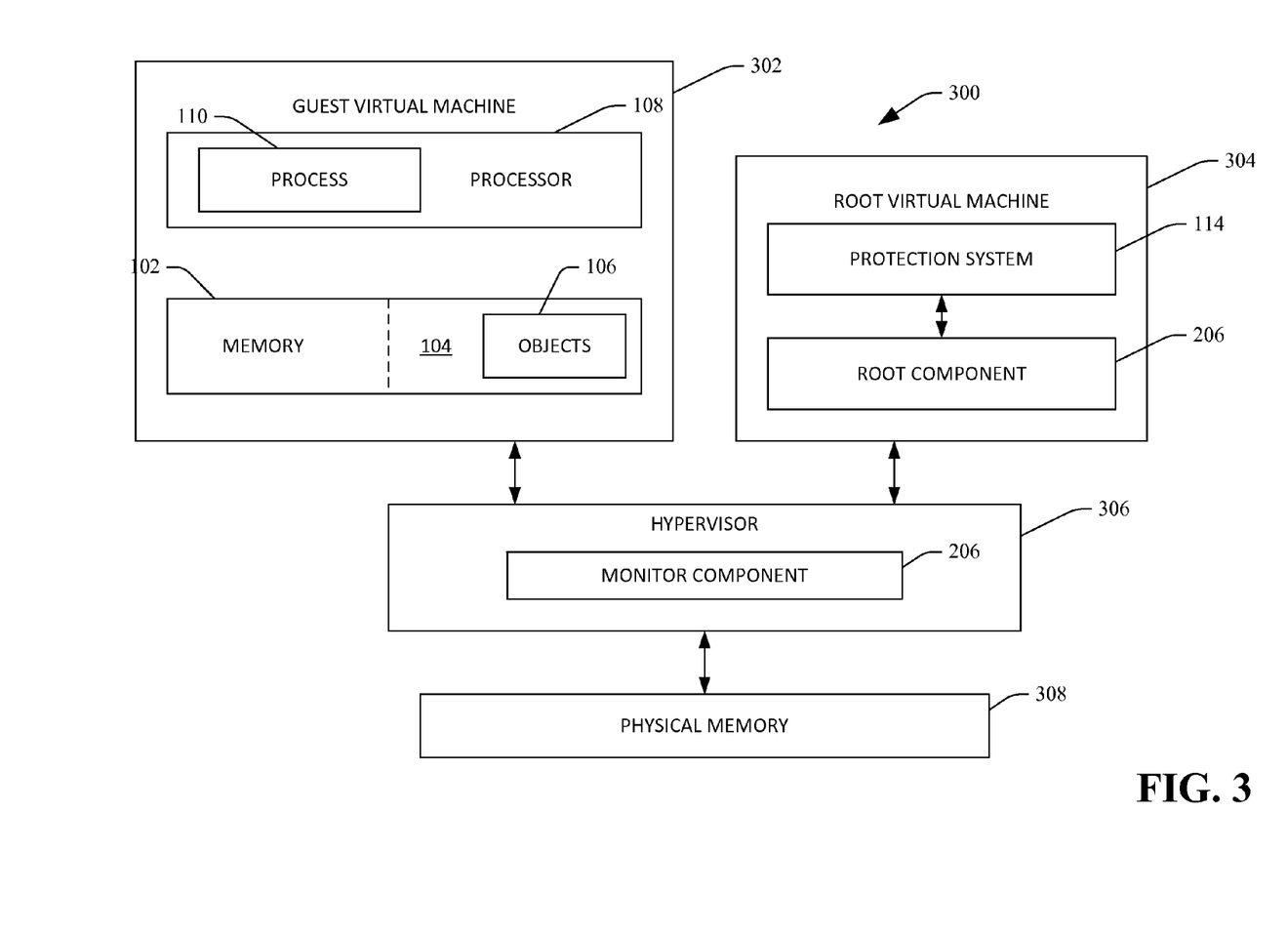
FIG. 3 is a functional block diagram of an exemplary system that facilitates monitoring a process executing in a virtual machine for purposes of protecting the virtual machine.

Turning now to FIG. 3, an exemplary system 300 that facilitates prevention of execution of malicious code in a computing partition is illustrated. In an exemplary embodiment, the system 300 may be comprised by a server executing in a cloud computing environment, wherein the server includes a plurality of virtual machines. The system 300 comprises a guest virtual machine 302, which includes the memory 102 and the processor 108. As described above, the processor 108 may be a virtual processor and the memory 102 may be a virtual memory.

The system 300 further comprises a root virtual machine 304 (also referred to as a host virtual machine), wherein the root virtual machine 304 comprises the protection system 114 and the root component 206. The system 300 further comprises a hypervisor 306, which is configured to manage processing and memory resources to facilitate execution of multiple virtual machines on a computing device. Thus, the hypervisor 306 can maintain a mapping between the memory 102 in the guest virtual machine 302 and physical memory 308 that backs the memory 102 utilized by the guest virtual machine 302. In the exemplary system 300 shown in FIG. 3, the hypervisor 306 comprises the monitor component 112.

As will be recognized by one skilled in the art, the hypervisor 306 has some form of control over the memory 102 of the guest virtual machine 302, such that the hypervisor 306 can protect (e.g. read protect, write protect, or execute protect) pages in the memory 102 that are desirably monitored (the range 104 of the memory 102 that includes the objects 106). In an exemplary embodiment, the hypervisor 306 can have knowledge of an initial location in the memory 102 (and thus an initial location in the physical memory 308) that include the objects 106, and can clear a write permission bit of corresponding pages of the physical memory 308 in the nested page tables maintained by the hypervisor 306 associated with the guest virtual machine 302. Accordingly, any write accesses directed to such pages will trap into the hypervisor 306, and the monitor component 112 can collect information about write accesses when such accesses occur and output the information to the root component 206. The information can include the identity of the guest virtual machine 302, the identity of the processor 108, the target address in the memory 102, and whether the trapped write access was aimed at a monitored region of the memory 102 or to a non-monitored data element located on the same page. The hypervisor 306 can additionally emulate a trapped instruction and resume an operating system of the guest virtual machine 302 at the next instruction to be executed.

The root component 206 receives the information output by the monitor component 112, wherein the communication between the monitor component 112 and the root component 206 can be directed by way of a hypervisor-virtual machine bidirectional channel. In an exemplary embodiment, the channel can be implemented by using synthetic interrupts and the hypercall interface of the hypervisor 306 to direct notifications from the hypervisor 306 to the root virtual machine 304 and from the root virtual machine 304 to the hypervisor 306. Blocks of data can be passed through memory buffers shared between the hypervisor 306 and the root virtual machine 304.

The root component 206 abstracts data pertaining to memory write accesses made by the process 110 executing on the processor 108 that are received from the monitor component 112 to the level of changes made to fields of accessed objects. As will be described below, the root component 206 performs such task through maintenance of a shadow object graph that can mirrors the location, type, and disposition of each of the objects 106 being monitored.

In an exemplary embodiment, the root component 206 can be configured to determine which instance of a monitored object is being accessed by the process 110 as well as to which field of the object instance the access is directed. The root component 206 can make such determination via comparing the target address provided by the monitor component 112 against a list of memory intervals corresponding to object instance locations in memory, and then determining the field offset. The root component 206 can determine the type of the field from a definition of the object retained in operating system debugging files. If the access is directed towards a field that is not of interest to the protection system 114, then an object event is not created. Otherwise, the root component 206 determines if the field of the object instance that is the subject of the write is a pointer. If the root component 206 ascertains that the field of the object instance that is the subject of the write access made by the process 110 is not a pointer, then the root component 206 can generate an object event of type "object modified", and can transmit an object event of that type to the protection system 114. The object event can include data that identifies the object event type (object modified), the type of the object, the field subject to modification, and the value desirably written to the field.

If the root component 206 determines that the field is a pointer, the root component 206 can remove the edge corresponding to the old pointer value in the shadow object graph and can determine whether any objects exist that can no longer be reached from global variables in the shadow object graph. The root component 206 may then transmit a notification to the monitor component 112, instructing the monitor component 112 to cease monitoring for all of such objects (memory locations where such objects are retained) and such objects are removed from the shadow graph. Subsequently, the root component 206 can transmit an object event of type "object removed" to the protection system 114, thereby informing the protection system 114 that the write accessed desirably removes one of the objects 106.

The root component 206 can additionally determine if the object instance targeted by the new pointer value desirably written in the field by the process 110 is already a part of the shadow graph. If the object instance is not in the shadow graph, the target object is added to the graph, and an object event of type "object created" is transmitted to the protection system 114. The root component 206 then marks fields in the object type as being monitored for the monitor component 112, and if any of such fields are pointers themselves, the process described above is applied recursively until all object instances accessible from the root object through monitored pointer fields are added to the shadow graph.

In other words, based upon knowledge of the operating system executing in the guest virtual machine 302, the root component 206 can construct an initial shadow graph that comprises object instances that are known to be included at initialization of the operating system, and such shadow graph can be updated responsive to monitored portions of the memory 102 being accessed. By maintaining the shadow graph, the root component 206 is able to infer whether a write access to the monitored portion of the memory 102 pertains to modifying an existing object, deleting an existing object, or creating a new object. The root component 206 may then instruct the monitor component 112 as to which portions of the memory 102 need to be monitored as the location of objects in the memory 102 changes over time.

From the above, it can be ascertained that various security improvements are enabled through utilization of features of the system 300. Specifically, the protection system 114 resides on a separate computing partition from the guest virtual machine 302 that is monitored by the protection system 114. Additionally, the monitor component 112 intercepts all accesses to memory regions of interest, which are updated as objects are created, modified, and deleted.

Additional modifications may be undertaken with respect to the operating system to further enhance security of the system 300. For example, the operating system executing on the guest virtual machine 302 may have code that accesses the objects 106 in the memory 102 that are monitored by the monitor component 112, and such operating system code may be desirably write protected. In an exemplary embodiment, such code can be write-protected by manipulating page table entry permission bits inside the hypervisor 306.

Additionally, entry points to the operating system code that access objects monitored by the monitor component 112 may also be desirably protected, thereby preventing the operating system of the guest virtual machine 302 from being replaced on the fly by a malicious copy that does not utilize the objects 106 being monitored by the monitor component 112. For instance, with respect to the kernel of the operating system, such entry points may include interrupt descriptor table entries, fast system call registers, amongst other entry points.

In another exemplary embodiment, page table mappings corresponding to objects monitored by the monitor component 112 can be guarded to prevent page remapping attacks. For instance, if shadow paging is employed by the hypervisor 306, new page table entries can be evaluated to determine if they reference a page in physical memory 308 that include objects being monitored so, such entries can be marked as write protected. If nested paging is being employed, memory access monitoring occurs at the level of guest physical frames. The risk is that guest page table entries associated with monitored objects may be modified to refer to unmonitored guest physical frames that include copies of the objects, thereby circumventing the monitoring. Prevention of such attack requires monitoring all updates made to existing guest page table entries as well as the creation and/or destruction of page tables in the guest virtual machine 302, which can be undertaken through monitoring CR3 switches.

In another exemplary embodiment, one or more of the following performance optimizations can be undertaken to reduce overhead created by the trapping of write accesses to the range 104 of the memory 102 that includes the monitored objects 106. For example, a dedicated region of the memory 102 in the guest virtual machine 302 can be defined, where all desirably monitored objects are retained in such region. Such technique can reduce overhead created by memory access traps directed at non-monitored objects that reside in memory pages that also include monitored objects. For example, the operating system of the guest virtual machine 302 can be modified such that an object allocator only allocates objects of monitored types inside the reserved region of the memory 102. Alternatively, the operating system object allocator can dynamically relocate objects and adjust operating system state accordingly.

Furthermore, memory accesses can be processed in batches rather than individually, thereby leveraging the fact that modifications to fields of a single object are often done sequentially in code of the operating system executing on the guest virtual machine 302. Thus, after a first instruction in a batch is trapped by the hypervisor 306, the following instruction accessing the object would be processed and emulated before control is returned to the guest virtual machine 302, significantly reducing the number of transitions between the guest virtual machine 302 and the hypervisor 306.

In another exemplary embodiment, certain heavily accessed non-monitored fields that reside inside monitored objects can be relocated to a separate non-monitored region of the memory 102. This technique can reduce memory access traps resulting from accesses to that field. Such approach can be implemented statically by modifying operating system source code such that the code references the field at its new location. Alternatively, such technique can be employed dynamically by trapping accesses to a fields' original location and dynamically patching the code of origin to reference the new location.

Figure 4:
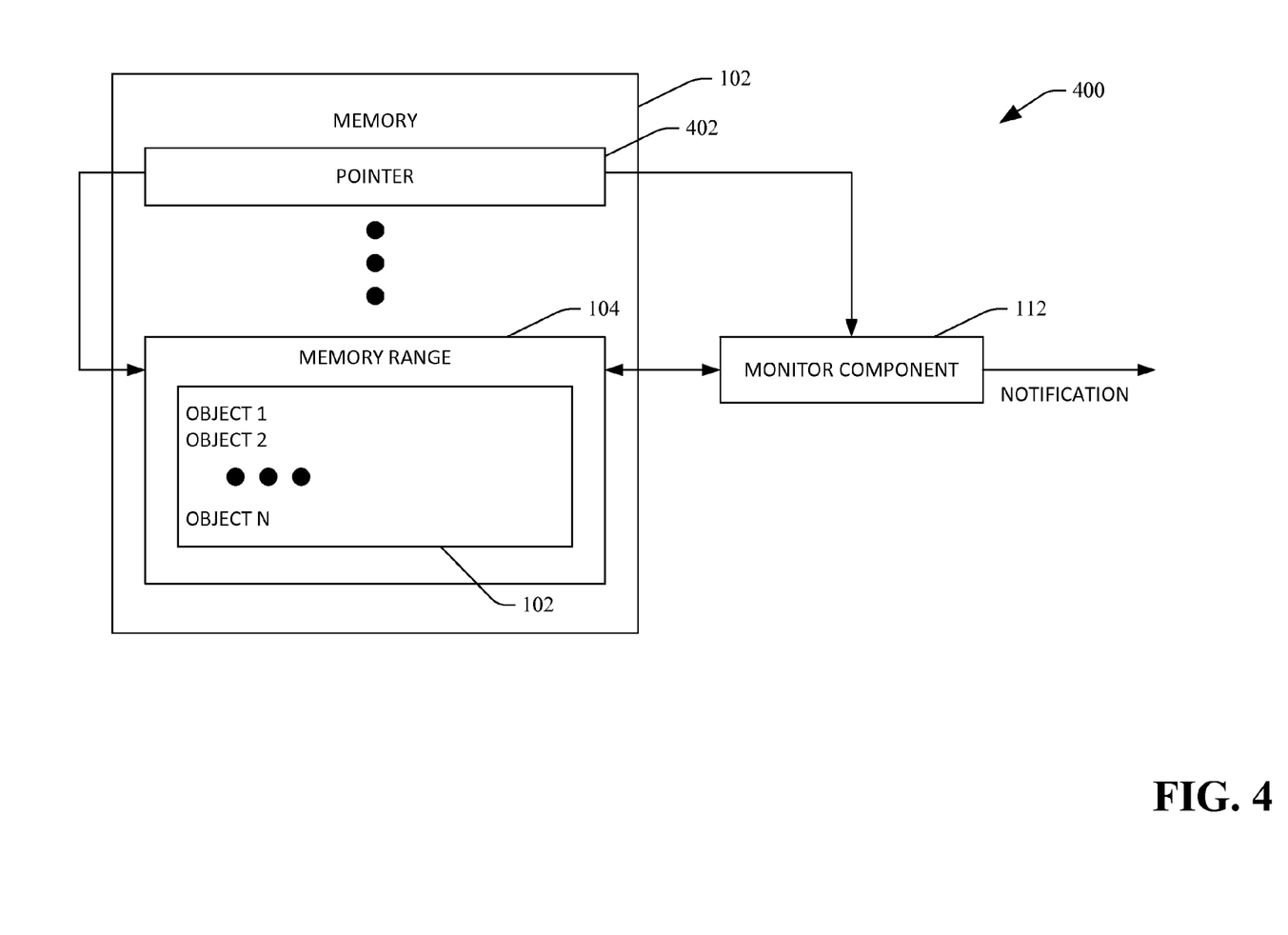
FIG. 4 is a functional block diagram of exemplary contents of a memory utilized by a virtual machine.

Now referring to FIG. 4, an exemplary depiction of the memory 102 is shown. An operating system that utilizes the memory 102 can cause a pointer 402 to be placed at a known location in the memory 102 at boot up of a computing system. The monitor component 112 has knowledge of the location of the pointer 402 in the memory 102, and therefore at boot up of the computing device the monitor component 112 can ascertain the range 104 of the memory 102 that includes desirably monitored objects 106. As described above, the objects 106 may be included in an object graph (such as a linked list of objects) that is employed in connection with defining an order of execution of various processes. Accordingly, such objects are data structures that include fields, wherein at least one field is a pointer that can point an operating system to a location of a corresponding process and/or can point to another object in the object graph. If any write accesses are directed to the memory range 104 subsequent to boot up, the monitor component 112 can intercept such write accesses and can pass a notification to the root component 206, which can operate as described above. It is to be understood that the memory range 104 may be dynamic in nature (as objects in the object graph are added, modified, or removed). Therefore, while the memory range 104 may initially include a first memory page or sequence of memory pages, as processes are executed such memory page range may include other pages (which may be non-sequential).

Figure 5:
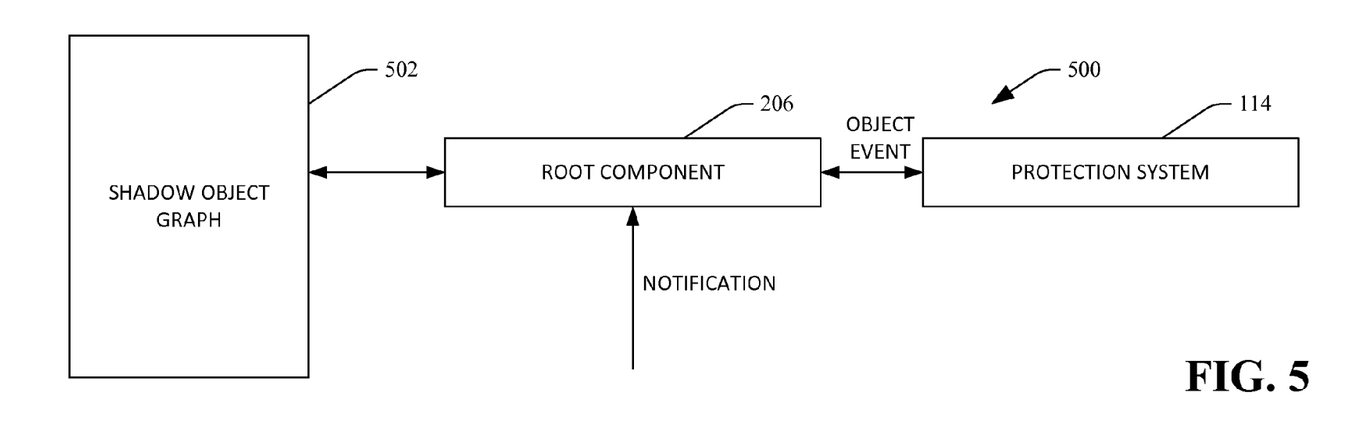
FIG. 5 is a functional block diagram of an exemplary system that facilitates determining an object event for provision to a protection system through utilization of a shadow object graph.

Referring now to FIG. 5, an exemplary system 500 that facilitates providing an object event to the protection system 114 is illustrated. The system 500 includes the root component 206 that generates a shadow object graph 502 at boot up of a computing partition that is desirably monitored by the protection system 114. As the root component 206 has knowledge of the initial states of the operating system of the computing partition that is desirably protected, the root component 206 can generate (or have access to) an initial shadow object graph that mirrors an initial object graph that includes desirably monitored objects. The shadow object graph 502 can thus be perceived as being a data structure that mirrors an object graph utilized by an operating system. As desirably monitored data objects are added, removed, or modified, the roots component 206 can update the shadow object graph 502 and can also transmit object events to the protection system 114.

Figure 6:
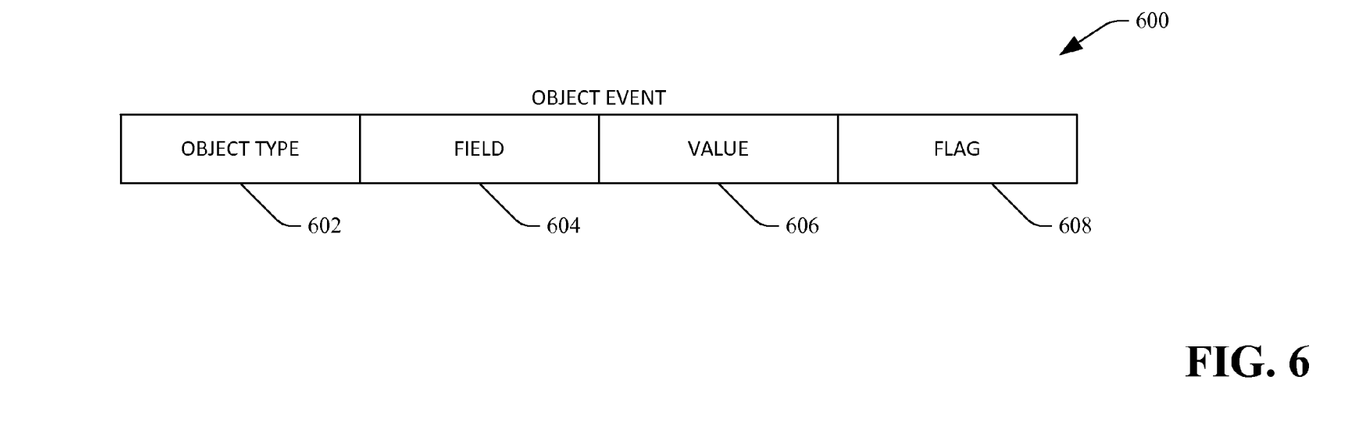
FIG. 6 illustrates an exemplary object event.

With reference now to FIG. 6, an exemplary object event 600 that can be provided to the protection system 114 is shown. The object event 600 can comprise a plurality of fields 602 through 608. The field 602 can indicate a type of the object that is desirably created, removed, or modified by the process 110. Object types that are desirably modified can be ascertained empirically and/or on an experimental basis based upon requests of the protection system 114 and/or evolving malicious attacks.

The field 604 of the object event 600 can identify a field (or fields) that is desirably modified by the process 110 executing on the processor. The field 606 can include a value of the field that is written (a new value desirably written to the field by the process 110 and/or an existing value for such field). The field 608 can include a flag that indicates whether the object is desirably created, removed, or modified (an object event type). Responsive to receiving such object event, the protection system 114, for example, can infer whether a process is desirably created, whether a file is desirably created, whether a new network connection request is desirably created, etc. Thereafter, the protection system 114 can scan the file in the targeted partition to ascertain whether files/data related to a system event (e.g., file creation, process creation) are malicious.

Figure 7:
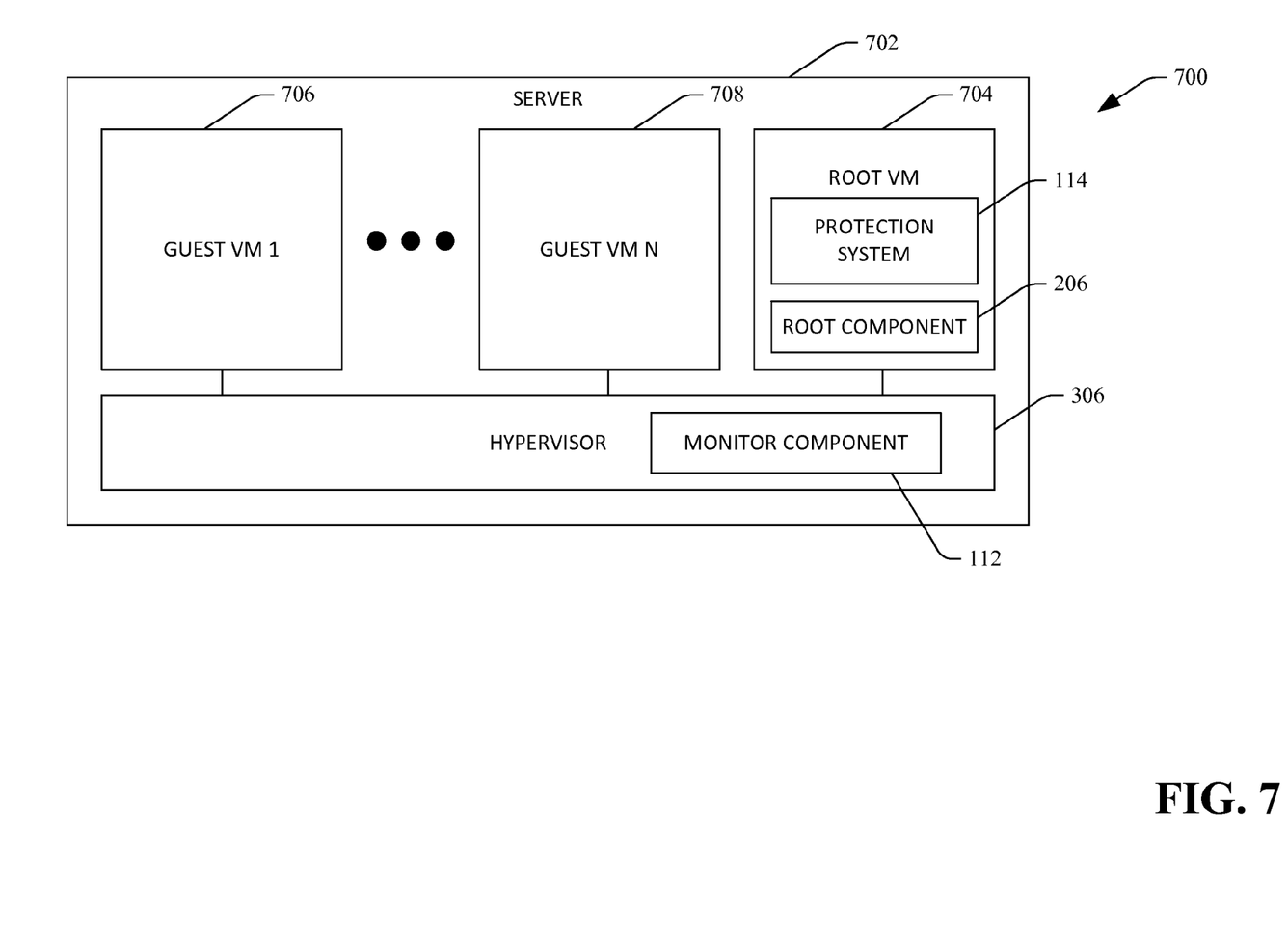
FIG. 7 illustrates an exemplary server that comprises a plurality of virtual machines.

Now turning to FIG. 7, an exemplary computing environment 700 where aspects described above can be implemented is shown. The computing environment 700 comprises a server 702 that may be a portion of a cloud computing system. The server 702 includes a root or host virtual machine 704, which comprises the protection system 114 and the root component 206. The server 702 also includes a plurality of guest virtual machines 706-708, wherein the guest virtual machines 706-708 are desirably protected by the protection system 114. The hypervisor 306 is configured to present virtual operating platforms to the guest virtual machines 706-708 and manage execution of the guest virtual machines 706-708. The hypervisor 306 includes the monitor component 112, which can effectively monitor different ranges of memories utilized by the guest virtual machines 706-708, respectively, to trap write requests to certain monitored memory regions that include desirably monitored data structures. As can be ascertained by viewing such environment 700, a single protection system 114 can be employed on the server 702 to protect a plurality of different guest virtual machines 706-708 from malicious software attacks.

Figure 8:
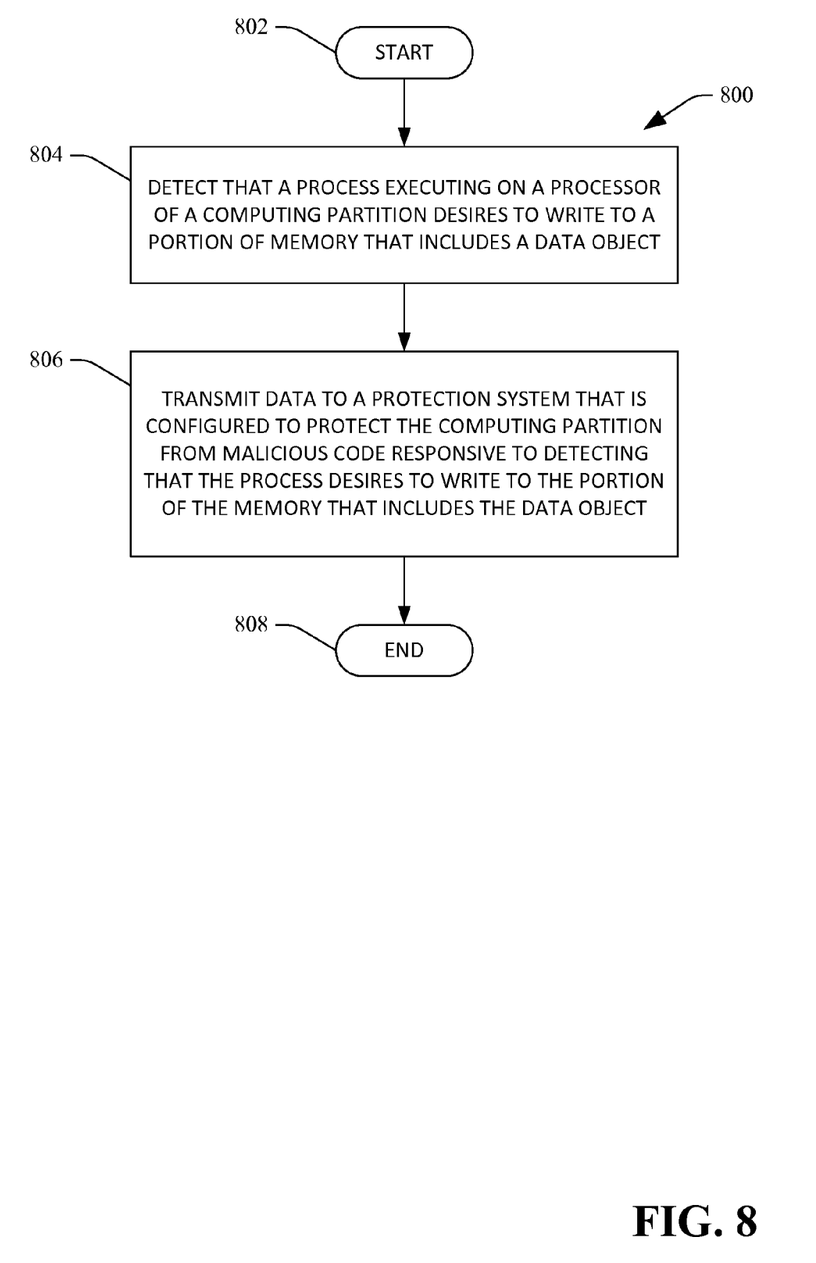
FIG. 8 is a flow diagram that illustrates an exemplary methodology for transmitting data to a protection system responsive to detecting access to a monitored data structure.
Figure 9:
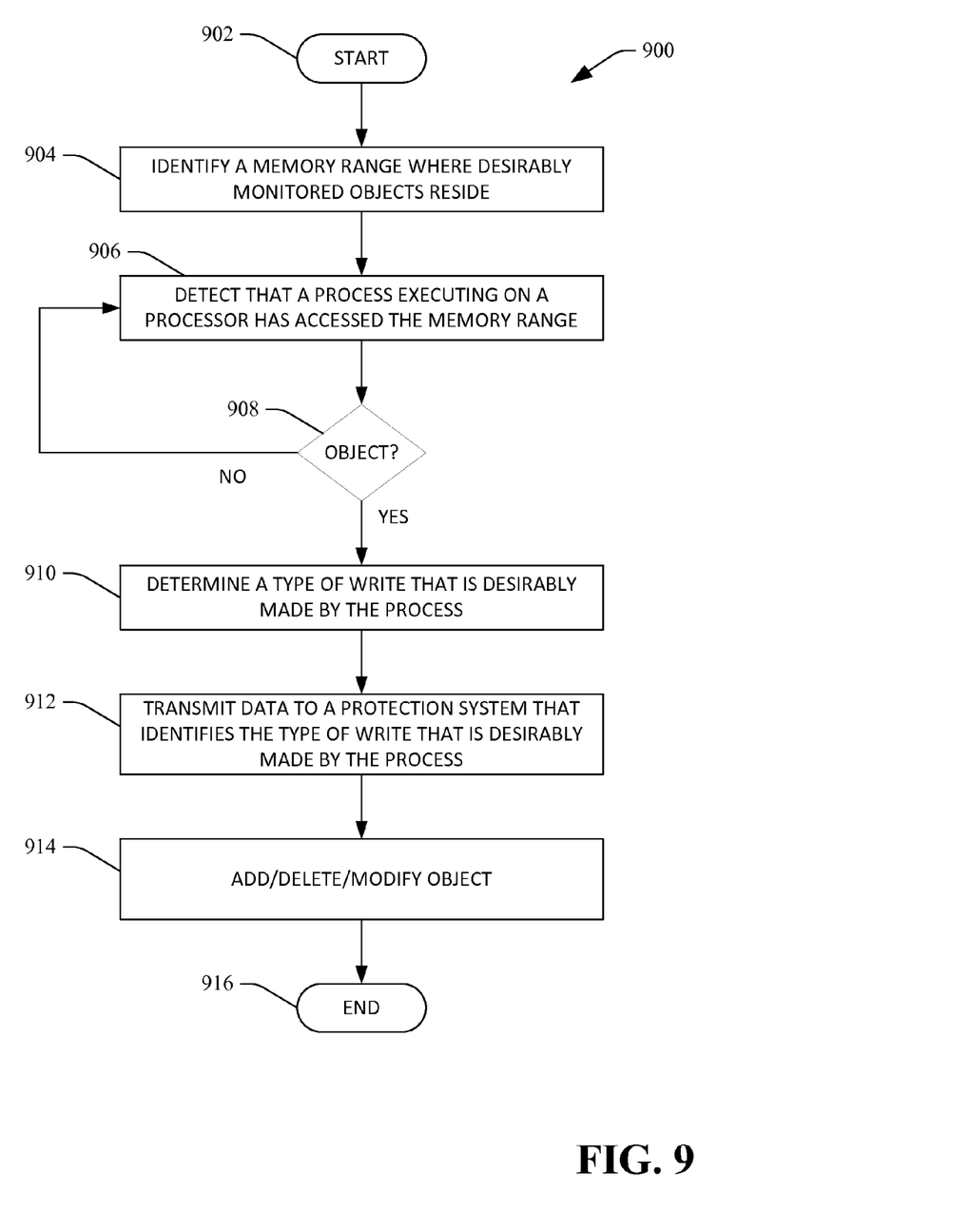
FIG. 9 is a flow diagram that illustrates an exemplary methodology for transmitting data to a protection system that identifies a type of write made by a process executing on a processor.

With reference now to FIGS. 8-9, various exemplary methodologies are illustrated and described. While the methodologies are described as being a series of acts that are performed in a sequence, it is to be understood that the methodologies are not limited by the order of the sequence. For instance, some acts may occur in a different order than what is described herein, in addition, an act may occur concurrently with another act. Furthermore, in some instances, not all acts may be required to implement a methodology described herein.

Moreover, the acts described herein may be computer-executable instructions that can be implemented by one or more processors and/or stored on a computer-readable medium or media. The computer-executable instructions may include a routine, a sub-routine, programs, a thread of execution, and/or the like. Still further, results of acts of the methodologies may be stored in a computer-readable medium, displayed on a display device, and/or the like. The computer-readable medium may be any suitable computer-readable storage device, such as memory, hard drive, CD, DVD, flash drive, or the like. As used herein, the term "computer-readable medium" is not intended to encompass a propagated signal.

Now referring to FIG. 8, an exemplary methodology 800 that facilitates transmittal of data to a system that is configured to protect a computing partition from malware is illustrated. The methodology 800 starts at 802, and at 804 it is detected that a process executing on a processor desires to write to a portion of memory that includes a desirably monitored data object (data structure). The data object includes a plurality of fields that are populated by a respective plurality of values. At 806, data is transmitted to the protection system responsive to detecting that the process executing on the processor of the computing devices desires to write to the portion of the memory that includes the data object. In an example, the acts of detecting and transmitting can be undertaken on separate computing partitions. The data transmitted to the protection system can be a notification that an object is desirably created, deleted, or removed. Responsive to receiving such notification, the protection system can scan an image file utilized to launch the process to ascertain whether the process is malicious. Similarly, in an example, if the notification indicates that a new file object is created (e.g., a new file is desirably created), the protection system can scan the new file to ascertain whether the new file is malicious. The methodology 800 completes at 806.

Referring now to FIG. 9, an exemplary methodology 900 that facilitates generating object events for receipt by a protection system is illustrated. The methodology 900 starts at 902, and at 904 a memory range where desirably monitored objects reside is identified. Such memory range can be identified through analysis of a value of a pointer set by the operating system at a known location in memory. For example, the pointer can point to a linked list of objects that are accessed by the operating system to identify different processes that are desirably executed and a sequence of execution of such processes.

At 906 it is detected that a process executing on a processor has accessed the memory range that includes the aforementioned objects. For example, the memory range may be a plurality of memory pages, and it can be detected that a process has requested to write to one of such pages.

At 908, a determination is made regarding whether the access is directed towards a monitored object or some other data that is co-located on a page with desirably monitored objects the access is not directed towards a desirably monitored object, the methodology 900 returns to act 906.

If, however, at 908 it is determined that the process has requested access to a desirably monitored object, then at 910 a type of write that is desirably made by the process is ascertained. Such type can be one of object creation, object removal, or object modification. Exemplary techniques for determining the desired type of write have been set forth above. At 912, data is transmitted to a protection system that identifies the type of write that is desirably made by the process. The protection system may then perform a computing operation based at least in part upon such data. For example, the protection system can approve the write and can allow the process requesting access to perform the requested write. Alternatively, the protection system can prevent the process from performing the requested write, can transmit a notification to a user or other computer executable program indicating that the access may be malicious in nature, etc. At 914, the requested write is performed (the object in the monitored region of memory is added, modified, or deleted). The methodology 900 completes at 916.

Figure 10:
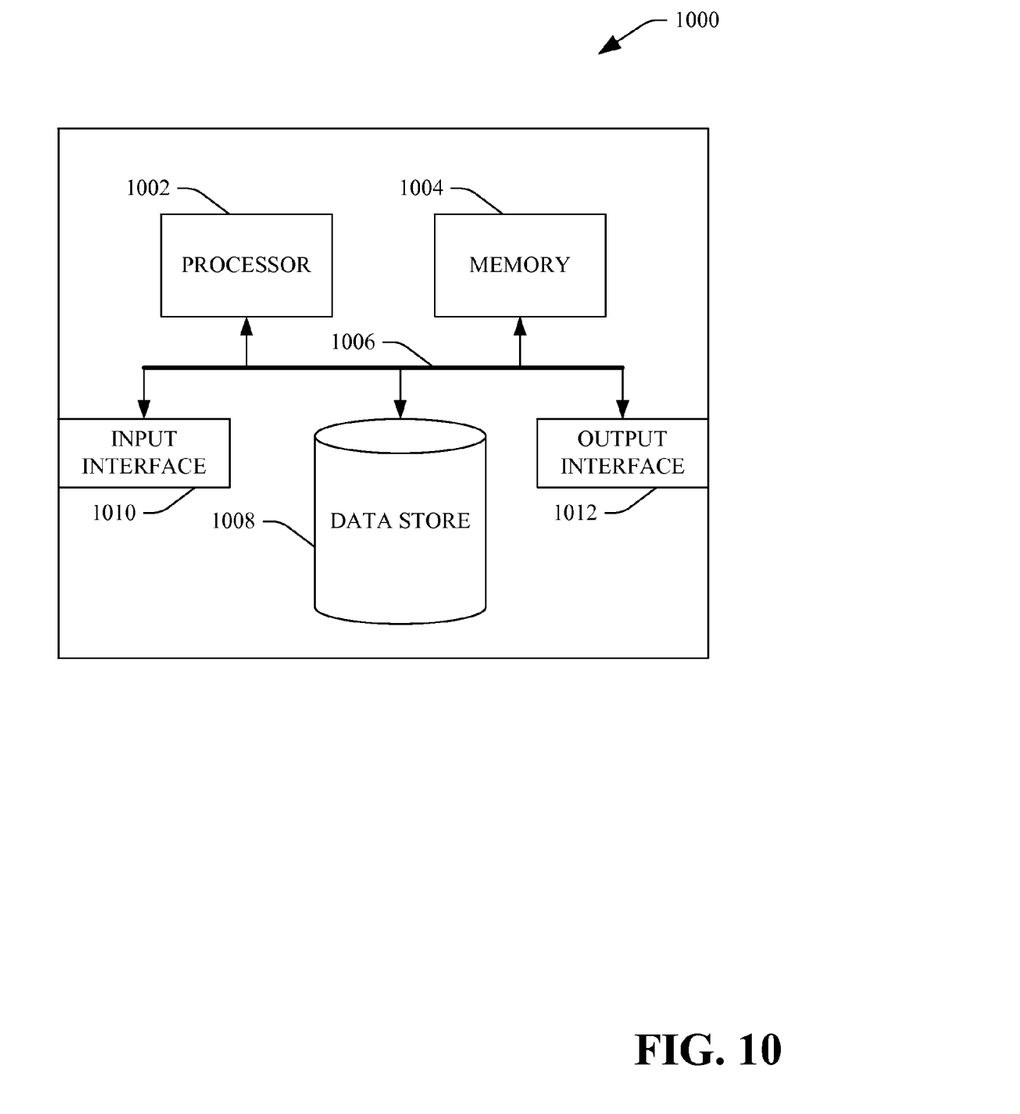
FIG. 10 is an exemplary computing system.

Now referring to FIG. 10, a high-level illustration of an exemplary computing device 1000 that can be used in accordance with the systems and methodologies disclosed herein is illustrated. For instance, the computing device 1000 may be used in a system that supports detecting memory writes to monitored regions of memory. In another example, at least a portion of the computing device 1000 may be used in a system that supports transmittal of object events to a protect on system. The computing device 1000 includes at least one processor 1002 that executes instructions that are stored in a memory 1004. The memory 1004 may be or include RAM, ROM, EEPROM, Flash memory, or other suitable memory. The instructions may be, for instance, instructions for implementing functionality described as being carried out by one or more components discussed above or instructions for implementing one or more of the methods described above. The processor 1002 may access the memory 1004 by way of a system bus 1006. In addition to storing executable instructions, the memory 1004 may also store data structures, etc.

The computing device 1000 additionally includes a data store 1008 that is accessible by the processor 1002 by way of the system bus 1006. The data store may be or include any suitable computer-readable storage, including a hard disk, memory, etc. The data store 1008 may include executable instructions, data structures, etc. The computing device 1000 also includes an input interface 1010 that allows external devices to communicate with the computing device 1000. For instance, the input interface 1010 may be used to receive instructions from an external computer device, a user, etc. The computing device 1000 also includes an output interface 1012 that interfaces the computing device 1000 with one or more external devices. For example, the computing device 1000 may display text, images, etc, by way of the output interface 1012.

Additionally, while illustrated as a single system, it is to be understood that the computing device 1000 may be a distributed system. Thus, for instance, several devices may be in communication by way of a network connection and may collectively perform tasks described as being performed by the computing device 1000.

It is noted that several examples have been provided for purposes of explanation. These examples are not to be construed as limiting the hereto-appended claims. Additionally, it may be recognized that the examples provided herein may be permutated while still falling under the scope of the claims.

What is claimed is:

1. A method, comprising:
    detecting that a process executing on a processor of a first computing partition desires to write to a portion of memory that includes a data object, the data object comprising a plurality of fields that are populated by a plurality of respective values;
    responsive to detecting that the process desires to write to the portion of the memory, inferring a type of memory write to be performed by the process at the portion of the memory; and
    transmitting data to a protection system that is configured to protect the first computing partition from malicious code responsive to inferring the type of memory write to be performed by the process.

2. The method of claim 1, wherein the protection system is executing in a second computing partition that is separate from the first computing partition.

3. The method of claim 2, wherein the first computing partition is a first virtual machine and the second computing partition is a second virtual machine, wherein the first virtual machine and the second virtual machine reside on the same computing device.

4. The method of claim 3, wherein the first virtual machine is a guest virtual machine and the second virtual machine is a host virtual machine.

5. The method of claim 4, wherein detecting that the process executing on the processor of the first computing partition desires to write to the portion of memory that includes the data object is undertaken in a hypervisor.

6. The method of claim 5, further comprising:
    write protecting a page of memory that comprises the data object, wherein a write request to the page of memory that comprises the data object is trapped in the hypervisor.

7. The method of claim 6, wherein detecting that the process executing on the processor of the first computing partition desires to write to the portion of memory that includes the data object comprises comparing a target address in a write request from the process to a predefined address range to differentiate between desirably monitored data objects and co-located data elements in the page of memory.

8. The method of claim 1, wherein the data transmitted to the protection system is an object event, the object event comprising a flag that indicates whether the write to the data object is to create a new data object, delete an existing data object, or modify the existing data object.

9. The method of claim 8, wherein the object is in an object graph generated by an operating system of the first computing partition, and wherein objects in the object graph identify processes to be executed by the processor and an order of execution of the processes.

10. The method of claim 9, further comprising:
    identifying a field of the data object that is desirably modified by the process executing on the processor; and
    determining whether or not the field is a pointer to another object in the object graph;
    wherein inferring the type of write that is to be performed by the process executing on the processor is based upon whether or not the field is the pointer to another object in the object graph, wherein the type of write is one of object creation, object deletion, or object modification, and wherein the data transmitted to the protection system comprises the type of write.

11. The method of claim 1 executed in a mobile telephone.

12. The method of claim 1 executed in a cloud computing system.

13. A system, comprising:
    a monitor component that identifies that a process executed by a processor on a computing device has accessed a portion of memory that is known to comprise data structures, the monitor component outputting data that identifies an address in memory accessed by the process;
    a root component that receives the data that identifies the address in memory accessed by the process and infers a type of memory write that is desirably performed by the process responsive to receiving the data that identifies the address in memory accessed by the process, and wherein responsive to inferring the type of memory write that is desirably performed by the process, the root component transmits an object event to a protection system that is configured to prevent execution of malicious code by the processor.

14. The system of claim 13, wherein the process executed by the processor executes in a first computing partition, wherein the monitor component executes in a second computing partition, and wherein the root component and the protection system execute in a third computing partition.

15. The system of claim 14, the first computing partition being a first virtual machine, the second computing partition being a hypervisor, and the third computing partition being a second virtual machine.

16. The system of claim 15 comprised by a server in a cloud computing environment.

17. The system of claim 13, wherein the data structure comprises a plurality of fields, wherein the root component determines which field in the data structure is desirably written to by the process, and wherein the type of memory write that is desirably performed by the process is inferred based at least in part upon the field in the data structure that is desirably written to by the process.

18. The system of claim 17, wherein the type of memory write is one of a memory write to create a data structure, a memory write to remove a data structure, or a memory write to modify a data structure.

19. The system of claim 13, the data structure being an object in a linked list of objects, the linked list of objects generated by an operating system of the computing device, objects in the linked list of objects identifying to the processor processes that are to be executed by the processor and an order that the processes are to be executed by the processor.

20. A computer-readable data storage device comprising instructions that, when executed by a processor, cause the processor to perform acts comprising:

write-protecting a page in memory utilized by a first computing partition, the page in the memory comprising an object that is desirably monitored, the object comprising a plurality of fields having a plurality of respective values, and the object being in a linked list of objects defined by an operating system of the first computing partition;

detecting, in a second computing partition, that a process being executed by a processor utilized by the first computing partition has requested to write to the page;

responsive to detecting that the process being executed by the processor has requested to write to the page, detecting that the process being executed by the processor has requested to write to the object;

in a third computing partition, determining which field of the object is desirably written to by the process being executed by the processor;

in the third computing partition, determining whether the field comprises a pointer to another object in the linked list of objects;

in the third computing partition, determining a type of write desirably undertaken by the process being executed by the processor, the type of write being one of creation of a new object in the linked list of objects, deletion of an existing object from the linked list of objects, or modification of the object in the linked list of objects; and transmitting data that identifies the type of write desirably undertaken by the process being executed by the processor to a protection system, the protection system configured to protect the first computing partition from malware.

* * * * *